United States Patent [19]

Farley et al.

[11] 4,392,514

[45] Jul. 12, 1983

[54] APPARATUS AND METHOD FOR PRECISION GAS MIXING

[75] Inventors: Max F. Farley, Marietta; Laughton T. Fine, Cincinnati, both of Ohio

[73] Assignee: Queue Systems, Inc., Parkersburg, W. Va.

[21] Appl. No.: 228,199

[22] Filed: Jan. 26, 1981

[51] Int. Cl.³ ............................................ G05D 11/13
[52] U.S. Cl. .................................. 137/624.2; 137/607
[58] Field of Search ............... 137/624.2, 624.15, 607, 137/606; 222/638, 639; 307/141, 141.4; 364/143

[56] References Cited

U.S. PATENT DOCUMENTS

| | | | |
|---|---|---|---|
| 3,367,308 | 2/1968 | Quattrone et al. | 119/15 |
| 3,749,111 | 7/1973 | Dobritz | 137/100 |
| 3,774,056 | 11/1973 | Sample | 364/143 X |
| 3,809,109 | 5/1974 | Breiling et al. | 137/88 |
| 3,830,256 | 8/1974 | Cox | 137/599 |
| 3,848,617 | 11/1974 | Dray | 137/88 |
| 3,886,971 | 6/1975 | Lundsgaard et al. | 137/599 |
| 3,905,384 | 9/1975 | Berger | 137/111 |
| 4,019,523 | 4/1977 | Clark et al. | 137/7 |
| 4,062,373 | 12/1977 | Clark et al. | 137/3 |
| 4,072,148 | 2/1978 | Munson et al. | 128/142.2 |
| 4,165,532 | 8/1979 | Kendall | 137/624.2 X |

*Primary Examiner*—Alan Cohan
*Attorney, Agent, or Firm*—Cushman, Darby & Cushman

[57] ABSTRACT

Method and apparatus for precisely mixing gases in which solenoid valves sequentially feed separate gases to be mixed to a common pressure regulator and flowmeter.

22 Claims, 3 Drawing Figures

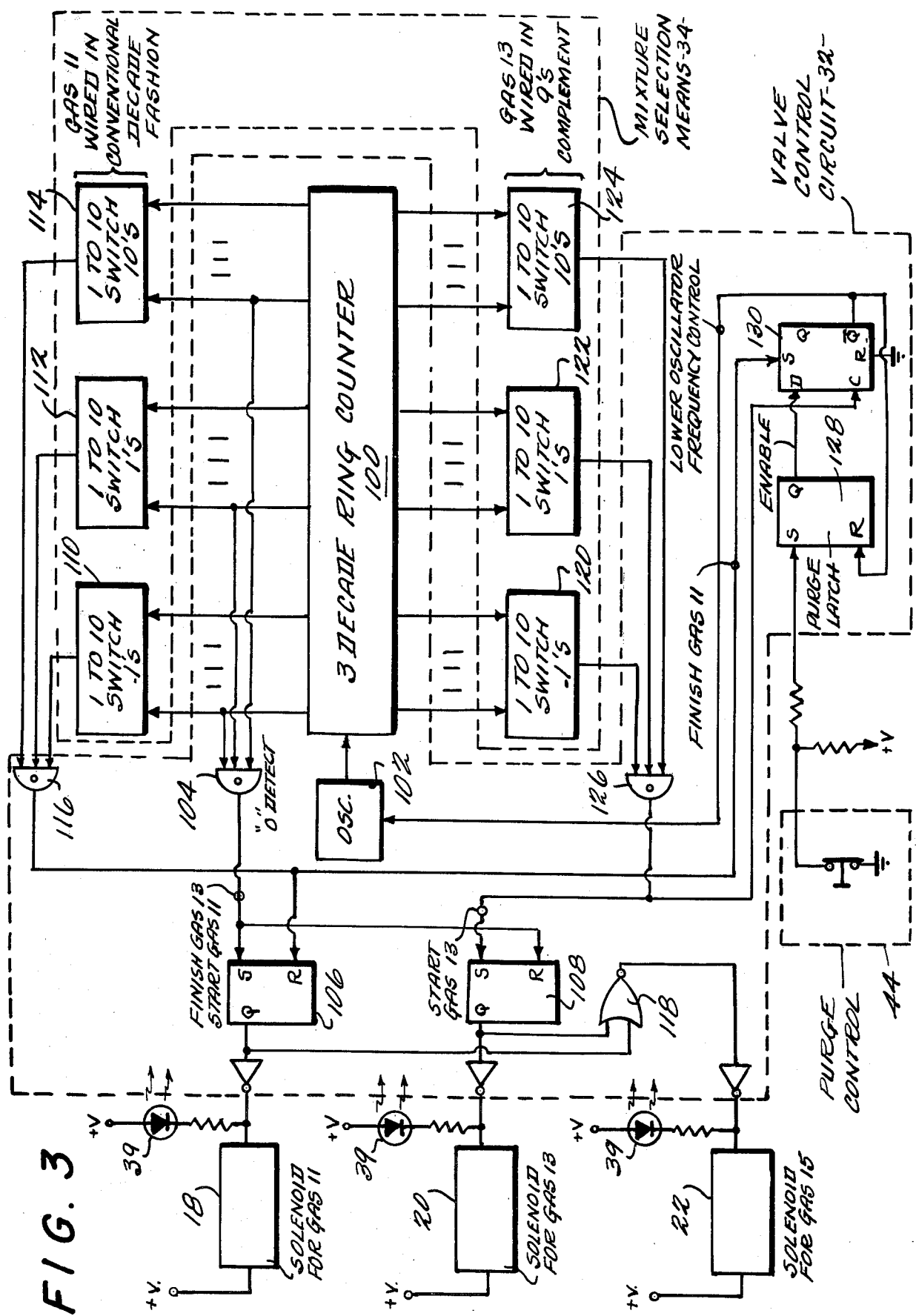

APPARATUS AND METHOD FOR PRECISION GAS MIXING

BACKGROUND OF THE INVENTION

1. Field of Invention

This invention relates to a method and apparatus for mixing gases in precise proportions. Such a device is especially useful for maintaining a controlled composition atmosphere in devices such as laboratory incubators.

2. Description of the Prior Art

Several laboratory procedures require the use of a controlled composition atmosphere. There are numerous known methods and associated devices for precisely mixing gases to obtain such an atmosphere. In one system, a gas composition sensing device, such as a thermal conductivity sensor, senses gas composition in the chamber where it is desired to maintain a precisely controlled atmosphere. When the sensor device detects that the concentration of a component gas (e.g., $CO_2$) has dropped below a predetermined threshold, it opens a solenoid valve to permit more of that gas to flow into the chamber. This gas continues to flow until the sensing device indicates that the desired concentration has been restored, at which time it causes the solenoid valve to close. In such a system, gas does not flow continuously, but rather is introduced into the chamber only as required. The reliability and accuracy of such a system is necessarily limited to the reliability and accuracy of the gas composition sensing device employed.

In another known system, the gases to be mixed continuously flow together at a confluence upstream of the chamber. The desired proportion is achieved by using a flow regulation device to limit the flow of each gas to a desired known rate prior to its confluence with other gases. Thus, in such a system, the relative mixing ratios are achieved by preselecting the relative flow ratios of the separate gases. The mixing ratio is usually fixed. After confluence, the mixed gas stream flows at a constant rate of flow into the chamber in which the controlled composition atmosphere is to be maintained. The mixed gas stream is slightly pressurized with respect to the atmosphere in the chamber so that it forces gas already in the chamber to exhaust through leaks provided for that purpose.

In either of the systems just described, provision is commonly made for purging systems which quickly re-establish the controlled composition atmosphere in the chamber after contamination with outside air.

A third known method employs solenoid valves to introduce the gases to be mixed separately and sequentially into the chamber. The desired mixing ratio is achieved by varying the proportional amount of time each gas is permitted to flow into the chamber. Such a system is disclosed in U.S. Pat. No. 4,062,373 granted to Clark et al. on Dec. 13, 1977. The system disclosed there, however, requires a sophisticated technique for balancing the pressure in the separate gas lines upstream of their respective solenoid valves to assure equal rates of flow for each gas for the time interval it is permitted to enter the chamber. Also, the system makes no provision for purging unwanted gas and rapidly restoring the desired atmosphere after contamination.

These and possibly other types of prior art gas mixing systems are disclosed in the U.S. patents listed below:

U.S. Pat. No. 4,062,373—Clark et al.
U.S. Pat. No. 4,019,523—Clark et al.
U.S. Pat. No. 3,830,256—Cox
U.S. Pat. No. 3,367,308—Quattrone et al.
U.S. Pat. No. 3,749,111—Dobritz
U.S. Pat. No. 3,809,109—Breiling et al.
U.S. Pat. No. 3,848,617—Dray
U.S. Pat. No. 3,886,971—Lundsgaard et al.
U.S. Pat. No. 3,905,384—Berger
U.S. Pat. No. 4,072,148—Munson et al.

SUMMARY OF THE INVENTION

The present invention is a method and apparatus for precisely mixing two or more gases. In the exemplary embodiment, a conduit for each gas leads from its respective gas source to a junction with the conduits for other gases. This conduit is then connected to a mixing chamber through a common pressure regulator and flowmeter. A solenoid valve is positioned in each conduit at equal distances just upstream of the common junction. In operation, only one of the solenoid valves is opened at any one time. Each valve stays open for a preselected (programmable) period of time, permitting the flow of gas through a common pressure regulator and flowmeter. Thereafter, this valve closes, terminating the flow of its respective gas in the conduit controlled by that valve. Another solenoid valve then simultaneously opens, permitting the flow of another gas into the mixing chamber through the same pressure regulator and flowmeter. Each valve permits the gas in its respective conduit to flow for an amount of time related to the proportion of that gas in the composition desired in the mixing chamber. The process continues until each gas has been introduced into the mixing chamber, and then recommences. Controls are provided to permit the operator to select the relative durations of the periods of flow for each gas quickly and easily.

The use of a common pressure regulator and flowmeter avoids variations in relative flow rates caused by variations between different devices. The continuous flow of gas provided by the device reduces the need for mechanical devices to circulate air and prevent gas distribution inhomogeneities in the chamber where a uniform controlled composition atmosphere is desired. The system also eliminates the need for sophisticated techniques to balance the pressure of the gases upstream of the solenoid valves. The system does not rely on gas composition sensing devices and thus eliminates the calibration difficulties, drift, overshoot, hysteresis and variation with temperature and relative humidity which limit the accuracy of such devices and any system which incorporates them. The system also does not have fixed mixing ratios, but rather permits the operator to vary the ultimate desired gas composition. The use of electronically timed solenoid valves permits precise control of the interval each gas is to flow, thus enhancing accuracy in the proportions of the final mixture. Finally, the use of electronically controlled valves permits a system in which the flow of all gases can be automatically terminated in the event of a power failure, thus eliminating the possibility of a build-up of any of the component gases in such event.

BRIEF DESCRIPTION OF THE DRAWINGS

Other advantages of the invention will become apparent from the following detailed description of the presently preferred embodiment, taken together with the accompanying drawings wherein:

FIG. 3 is a block diagram of suitable electronic circuitry for use with the exemplary embodiment of FIG. 1.

DETAILED DESCRIPTION

Figure 1:
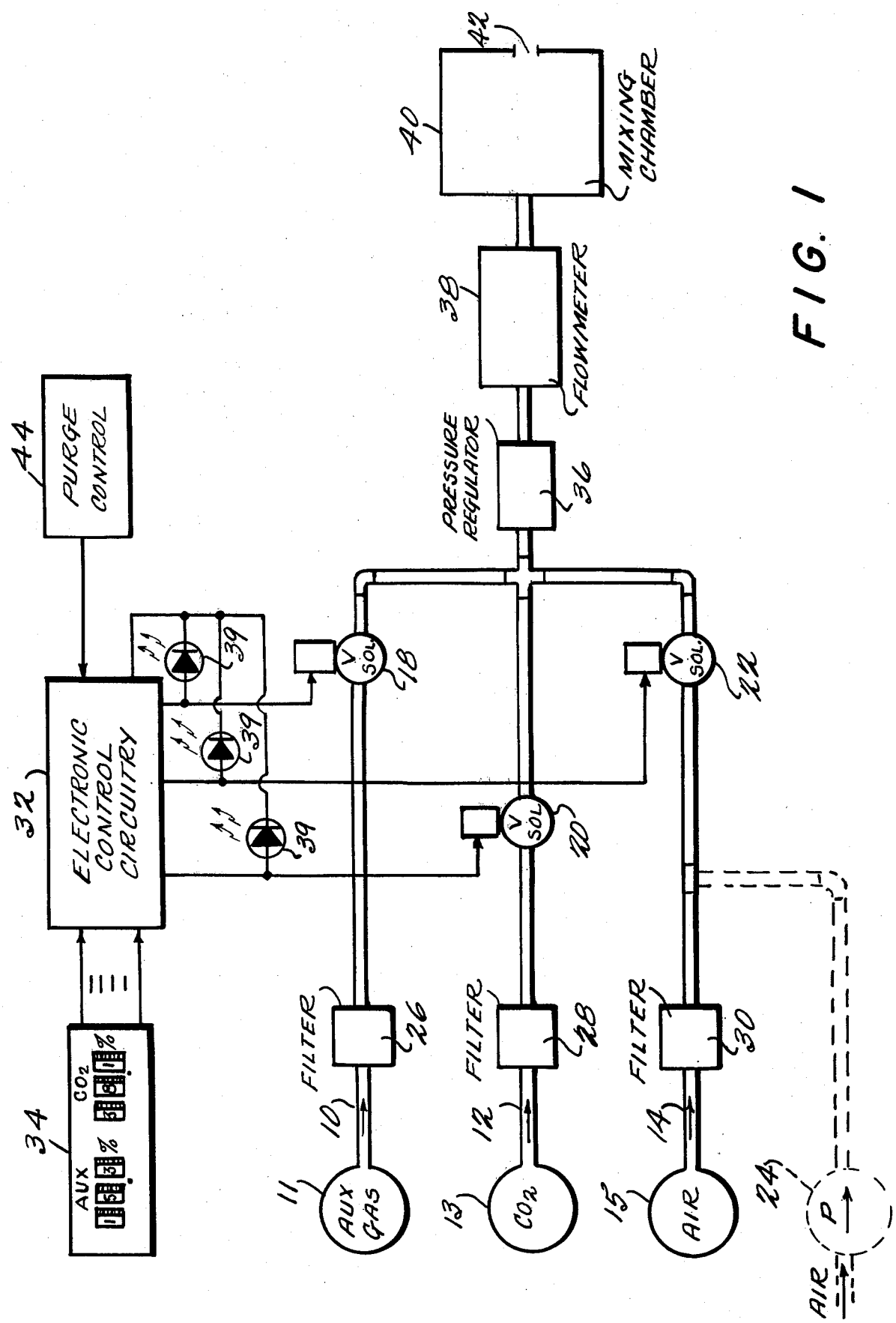
FIG. 1 is a schematic diagram of an exemplary precision gas mixing system according to the present invention.

Referring to the exemplary embodiment shown in FIG. 1, three conduits 10, 12, and 14 convey three gases (hereinafter referred to as gases 11, 13, and 15, respectively) to solenoid valves 18, 20, and 22, respectively. In the preferred embodiment, conduits 10, 12, and 14 are one-eighth inch diameter tubing. Gases 11, 13, and 15 may originate from any conventional gas source, such as pressurized bottles or from a pressurized building gas system (preferably 5-25 psig). If one of the gases is air, it may alternatively be drawn from the ambient atmosphere by a pump 24 shown in phantom. Gas filters 26, 28, and 30 are preferably interposed in conduits 10, 12, and 14 to filter the gas before it reaches the solenoid valve. In the preferred embodiment, these filters are of a known type which may be removed, autoclaved and reused, or replaced, and which are about 99.9% effective at removing 0.3 micron particles.

In the preferred embodiment, solenoid valves 18, 20, and 22 are 140 milliampere 24 VDC solenoid valves having response times on the order of milliseconds, available from General Valve Corporation of East Hanover, N.J. They are controlled by control signals from valve control circuit 32. Valve control circuit 32 may be of any conventional type electronic circuit capable of supplying sequential solenoid actuation signals of preselectable duration. In the preferred embodiment, a digital circuit is employed which sequentially holds each valve open in turn for a time interval related to a value preselected by the operator by means of mixture selection means 34, which in the preferred embodiment are sets of three ten-position (tens, units and tenths) thumbwheel-type switches.

For example, in the exemplary system using three gas inputs, an oscillator is caused to run at 1,000 pulses per minute. The three-position thumbwheel switches associated with the aux gas 11 will be set at some value (e.g., 333) while those for $CO_2$ will also be set at some value (e.g., 400). Then suitable digital counter and comparison circuits can be conventionally provided to produce sequential solenoid control signals holding open, for example: valve 18 for the first 333 oscillator pulses, valve 22 for the next 267 oscillator pulses, and valve 20 for the next remaining 400 oscillator pulses. Other equivalent sequences could also be used as should be appreciated. In this way, assuming equal gas viscosities, the gases 11, 13, and 15 will be provided to the common pressure regulator 36 in relative time proportions of 333:400:267.

Of course, other conventional electronic control circuits could just as well be employed. For example, if three complete sets of thumbwheel switches are employed, then the counters might simply sequentially count preset xxx; yyy; zzz numbers of oscillator pulses to generate the required sequential solenoid control signals.

The oscillator frequency preferably can be varied to control the overall cycle time as may be desired, for example in purging operations. In addition, if the gas viscosities are not substantially equal, the thumbwheel switch settings will have to be altered in accordance with known calculations to achieve the desired relative gas flows.

Solenoid valves 18, 20, and 22 are connected on their downstream side to pressure regulator 36 with lengths (in the exemplary embodiment all substantially of equal three-quarter inch lengths) of tubing (e.g., of one-eighth inch diameter). Efforts are made in the preferred embodiment to minimize the volume of the interconnections between solenoid valves 18, 20, and 22 and pressure regulator 36, because gas trapped therein may impair mixing accuracy. The preferred embodiment uses a Model No. R-06-L22-NNE pressure regulator manufactured by C. A. Norgren Company, which is adjustable from one to fifty pounds per square inch outlet pressure, to be set at 3.5 to 4 pounds per square inch outlet pressure under normal operating conditions.

The downstream side of pressure regulator 36 is connected in turn to flowmeter 38. In the preferred embodiment, flowmeter 38 is a Matheson Model No. PM11230, which operates at flow rates from 0.5 to 2.4 liters per minute, and would typically be operated at 1 to 1.2 liters per minute. This type of flowmeter also has a visual display.

LEDs 39 are driven by the solenoid control signals to provide a visual indication of which gas in the sequence is flowing at any given instant. Together with the visual display of flowmeter 38, this provides for a quick determination of which gases may not for some reason be flowing as desired. The downstream side of the flowmeter is connected to mixing chamber 40, which in the preferred embodiment is an incubator having a volume of approximately 5.8 cubic feet.

Figure 2:
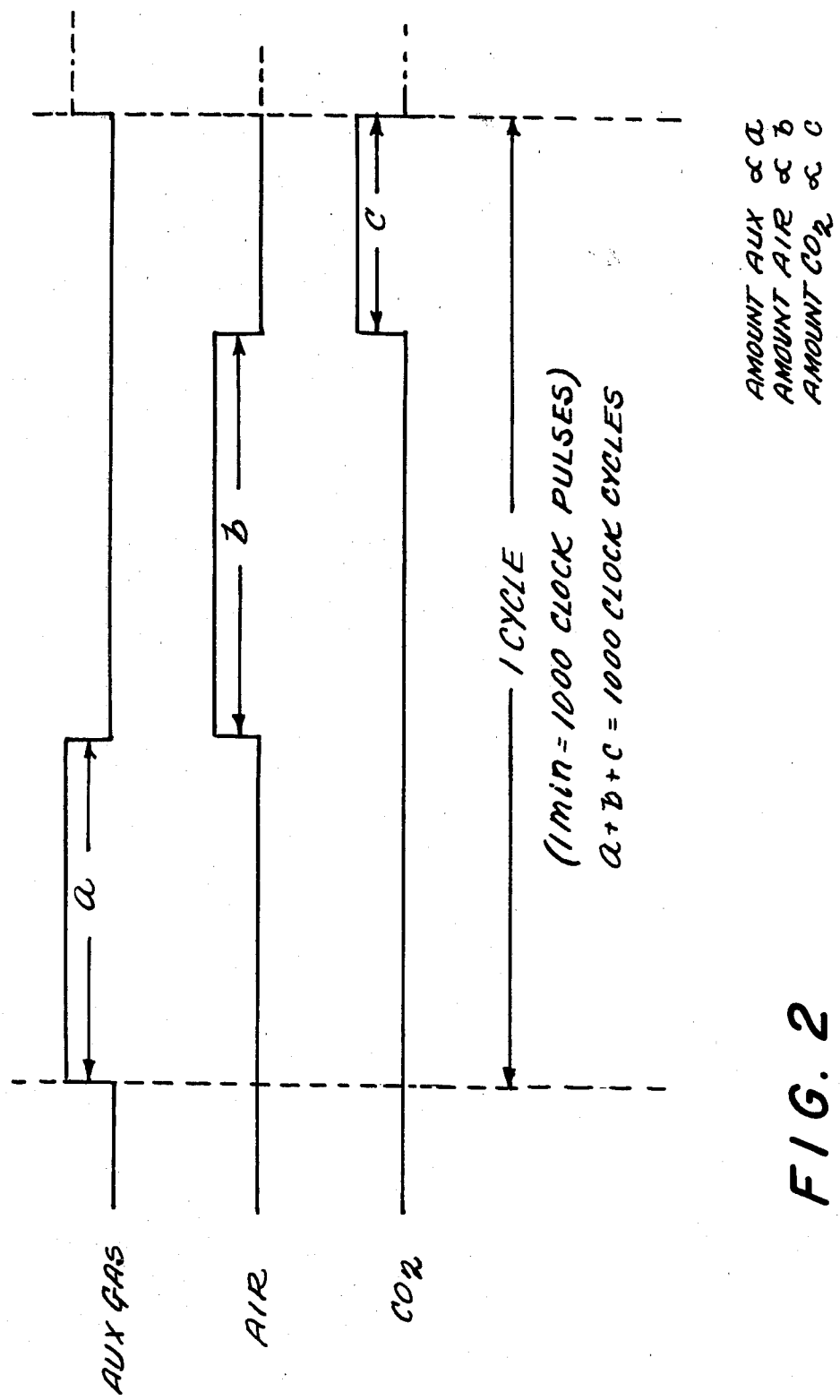
FIG. 2 is a timing diagram of the solenoid control signals utilized in the exemplary embodiment of FIG. 1.

In operation, the exemplary precision gas mixing system according to the present invention operates in the sequence indicated in FIG. 2. Valve control circuit 32 supplies a signal to one and only one of solenoid valves 18, 20, or 22; for example, solenoid valve 18. This permits gas 11 to flow from its associated source, through conduit 10, filter 26, and solenoid valve 18 to pressure regulator 36. At the same time, solenoid valves 20 and 22 are closed, preventing the flow of gases 13 and 15, respectively. Thus, gas 11 is the only gas flowing through pressure regulator 36. Pressure regulator 36 regulates the outlet pressure of gas 11 to a common specified (as desired by the operator) value. Gas 11 then flows to flowmeter 38. Flowmeter 38 has the characteristic that any gas entering it with the pressure specified by pressure regulator 36 will flow through flowmeter 38 at a constant and repeatable rate of flow. (Of course the design flow rate should preferably exceed any possible critical rate required for the flow rate to be substantially independent of downstream pressure.) Gas 11 thus flows into mixing chamber 40 at a constant rate and at a pressure slightly greater than the pressure in mixing chamber 40, which will normally be between 5 and 25 pounds per square inch. There, gas 20 disperses and mixes with the composite gas already present. Mixed gas displaced by the introduction of gas 11 exhausts through leak 42.

After a relative time interval related to the value preselected for that gas by the operator with mixture selection means 34, valve control circuit 32 ceases to open solenoid valve 18. This causes solenoid valve 18 to close, thus terminating the flow of gas 11.

At the same time, valve control circuit 32 supplies a signal to one and ony one of the other solenoid valves 20 or 22, for example, 22. This control signal causes solenoid valve 22 to open, thus permitting the flow of gas 15 from its associated source, through conduit 14, filter 30, and solenoid valve 22 to common pressure regulator 36. As in the previous case, only one gas flows through pressure regulator 36 because the other gases are obstructed by their respective closed solenoid valves. Gas 15 flows through pressure regulator 36, acquiring the identical outlet pressure acquired by gas 11 during its turn, thus gas 15 will flow through flowmeter 38 at precisely the same rate of flow as gas 10 did (assuming equal gas viscosities). Gas 15 then flows into mixing chamber 40, where it disperses and mixes with gases already present. Mixed gas forced out by the introduction of gas 15 exhausts through leak 42. Gas 15 will continue to flow for an interval of time related to the value preselected by the operator for that gas with mixture selection means 34.

In a precision gas mixing device constructed to combine more than three gases, valve control means 32 would continue to sequence through the solenoid valves, holding each open for an amount of time selected with mixture selection means 34. In the preferred embodiment, however, provision is made for combining no more than three gases, one of which is to be air, for example, gas 15. The manner of expanding the system to accommodate more than three gases, however, will be readily apparent to one skilled in the art.

In the preferred embodiment, the operator directly selects two three-digit values, one for each of the non-air gases, related to the time intervals the operator desires each non-air gas to flow. This three-digit value is a percentage, expressed to within a tenth, of the predetermined cycling time of the apparatus, i.e., the time established for the device to complete an introduction of every gas into the mixing chamber exactly once.

While the value of the cycling time is not critical, it must be chosen long enough to enhance valve lifetime and reduce both error due to valve operation time and noise, and short enough to prevent unwanted build-up of any single one of the component gases in mixing chamber 40. In the preferred embodiment, the cycling time is approximately one minute. Any percentage of cycle time not allocated to either of the two non-air gases with mixture selection means 34 is automatically allocated to air. For example, if the operator selects 50.0% and 40.0% as the percentages of a cycle to be allocated to gas 11 and 13 then gas 15, in this case air, automatically has a flow time of 10% of a cycle. If it is desired that no air enter the chamber, then the cycle percentages of gases 10 and 12 should sum to 100%.

Occasionally in the course of a procedure, the operator may find it necessary to open mixing chamber 42 to install or remove experimental apparatus. When this occurs, the controlled atmosphere in mixing chamber 42 unavoidably mixes with the outside air. Once the mixing chamber 42 has been resealed, it is desirable to restore the controlled composition atmosphere as rapidly as possible. In the preferred embodiment, this is accomplished by means of purge control circuit 44. After a contamination event, the operator merely activates this circuit. Then, instead of a normal length cycle time, the oscillator is slowed (e.g., by a factor of 100) so that the amount of time each of the non-air gases is introduced into mixing chamber 42 is automatically increased by an amount related to the proportion of that gas in the ultimate desired composition and the volume of mixing chamber 42. Also, provision is made for bypassing the cycle percentage which would otherwise be allocated to the introduction of air into mixing chamber 42. After purging, the device automatically reverts to the normal sequencing mode, permitting each gas to flow for an interval related to the values selected with mixture selection means 34.

Thus, in the exemplary system air, $CO_2$, and a third gas are each filtered and run to individual solenoid valves. The outputs of the three solenoid valves are connected together and drive a common pressure regulator and flowmeter before the gas is injected into the working chamber (e.g., an incubator). Control of the valves is provided by an electronic sequencing circuit which time proportions the valves such that each one is sequentially turned on. This circuit can be built in various conventional manners but, when built using digital counting techniques, can provide highly accurate timing control of the valves. A digital circuit based on, as an example 1000 counts, can provide the user with a digital input for the $CO_2$ in tenths of a percent, and for the auxiliary gas in tenths of a percent. Any remaining counts can automatically be delegated to the air solenoid. In this manner the user may then digitally select using a digital thumbwheel switch or similar device, the exact percentage of $CO_2$ and of the auxiliary gas required.

An advantage of time sharing the flowmeter and the pressure regulator is that variations of these devices, due to the normal error contributing factors of temperature, humidity, and basic manufacturing tolerances, are not significant since they similarly affect the flow of all three elements of the mixture. An advantage of this system over the typical prior automatic gas control system is that there is no required zeroing or calibration of a sensor. The typical thermal conductivity sensor used is highly affected by variations in temperature and humidity. In addition, the intermittent nature of the injection of gas in such prior automatic system creates a requirement for some form of mechanical air movement in the working chamber to prevent stratification and non-uniform distribution of the mixture. This problem is diminished in the new system since gas flow is present at all times. The common flowmeter used in the new precision gas mixing system also provides a means of monitoring the flow of the gases. Therefore, any problems such as an empty $CO_2$ tank, clogged filters, or bad solenoid valves, will be apparent by the fact that the flowmeter indication will vary. Lights are also provided to indicate, based on an output from the electronic sequencing circuit, which gas is flowing at what time.

While the total length of the timing cycle of this system is not critical, approximately a 1 minute cycle is presently preferred. As a compromise one factor to consider is that if a very long timing cycle were used one of the gases would be injected continuously for a long period of time and could create a variation in chamber percentage of that gas with time. The other constraint, of course, involves the life and action speed of the solenoids. If an extremely short time were used the solenoids would be cycled many, many times in a short period of time. This would create a potential reliability problem, possibly an objectionable noise problem, and also could degrade accuracy due to the response time of the valves.

The purging of the system is initiated by a user activated pushbutton which would typically be operated after the user has had the door of the chamber opened. (This might also be automatically sensed as should be appreciated.) Activation of this pushbutton preferably causes the basic clock rate of the sequencing circuit to be varied in proportion to the volume of the chamber. In addition, the order of injection preferably will be such that $CO_2$ is injected first and then the second gas at which time the system will automatically revert to its normal timing sequence.

The key to this purging approach is that the new clock time be adjusted at the factory to provide, based on the flow of the system, the correct amount of $CO_2$ and second gas be injected at a 100% rate for sequential time periods required to bring the chamber back to its normal operating conditions. Note that counting devices in the preferred sequencing circuit provide the basic ratioing and that the adjusted clock rate merely determines the counting rate for the counter. The advantages of this approach is that the user has to make no separate adjustment for the purge control. The ratios will automatically be maintained by the sequencing circuit. As soon as both gas solenoids have been opened long enough to restore the percentages specified to the chamber, the system will automatically return to its normal sequencing mode. Any error created by changes in chamber volume or the fact that the chamber may not have been totally evacuated, will eventually be corrected by the normal timing sequence.

Since the solenoid valves are normally closed, all gas supplies are automatically turned off in the event of power failure. Thus $CO_2$ build-ups (destructive to many incubated cultures) are absolutely prevented during power failures. When power returns to normal, the normal metered flows will automatically resume. Of course this failsafe feature might also be implemented with a separate normally closed valve(s).

Although many digital electronic circuits can be desired to implement the exemplary embodiment described above, one such presently preferred circuit is shown in FIG. 3. The heart of the circuit is a three-decade ring counter 100 continuously driven by an oscillator 102. As the counter passes its 000 state, gate 104 sets flip-flop 106 and resets flip-flop 108 to turn on solenoid 18 and permit the flow of gas 11.

As the counter passes xxx state selected by switches 110, 111, and 114, gate 116 acts to reset flip-flop 106 thus terminating the flow of gas 11. However since both flip-flops 106 and 108 are now reset, gate 118 turns on solenoid 22 to permit the flow of gas 15.

As the counter passes the 9's complement of the yyy state selected by switches 120, 122, and 124, gate 126 sets flip-flop 108 thus permitting the flow of gas 13. Of course, the flow of gas 15 is simultaneously terminated via gate 118 whenever either one of flip-flops 106 or 108 is set. The flow of gas 13 then continues until the counter passes through the 000 state and flip-flop 108 is reset via gate 104. This restarts the whole cycle just described.

Whenever purge control switch 44 is pushed, latch 128 is set and D-type flip-flop 130 is enabled. The next time counter 100 arrives at the 9's complement of yyy, the output of gate 126 will clock flip-flop 130 and initiate a purge cycle with the flow of gas 13. At this time, the Q output of flip-flop 130 is connected to automatically lower the frequency of oscillator 102 (e.g., by a factor related to the mixing chamber volume). The gas control cycle then continues at a much slower pace through one flow period for gas 13 and gas 11. However as soon as the flow of gas 11 is terminated via gate 116, flip-flop 130 is simultaneously set by this same signal so as to reset the purge latch 128 and to restore the oscillator 102 to its normal higher frequency.

Although only one embodiment of this invention has been described in detail above, those skilled in the art will readily appreciate that many modifications are possible without departing from the novel teachings and advantages of this invention. Accordingly, all such modifications are intended to be included within the scope of this invention as defined in the following claims.

What is claimed is:

1. A precision gas mixing apparatus of the type which mixes plural gases in desired proportions by sequentially permitting each gas to flow for selected time durations, which time durations are related to such desired proportions, said system comprising:
    plural nonpressure-regulated input gas flow lines, each having an electrically controllable on/off flow control device connected in series therewith; and
    a gas flow rate control means including a serially connected gas pressure regulator and gas flowmeter fluid connected in common to each of said on/off flow control devices for supplying any one of said plural gases at a desired preset gas flow rate whenever the respectively corresponding on/off flow control device is turned on.

2. A precision gas mixing system as in claim 1 wherein each said electrically controllable on/off flow control device comprises a solenoid-controlled gas valve.

3. A precision gas mixing system as in claim 1 or 2 further including visual indicator means associated with each on/off flow control device for indicating when it is turned on.

4. A precision gas mixing system as in claim 1 or 2 further comprising a digital electronic control circuit means connected to provide separate electrical signals for controlling each of said on/off flow control devices.

5. A precision gas mixing system as in claim 4 wherein each on/off flow control device is normally off in the absence of an electrical current therethrough.

6. A precision gas mixing system as in claim 1 or 2 further comprising
    an incubator connected as a gas mixing chamber to the output of said gas flow rate determining means.

7. An apparatus for mixing gases comprising:
    a plurality of means for conveying separate nonpressure-regulated gases;
    sequencing means connected to said plurality of conveying means for sequentially allowing the exclusive flow of each of said separate gases for a time period related to the desired proportion of each of said separate gases in a desired final mixture;
    pressure regulating and flow control means serially connected in common to sequentially pass the gases allowed to flow by said sequencing means for regulating the pressure and rate of flow of said each of said separate gases therethrough; and
    mixing chamber means connected to said regulating means for sequentially receiving each of said separate gases.

8. An apparatus as claimed in claim 7 wherein said sequencing means comprises:
    valve means for each of said plurality of conveying means, each valve means having an inlet connected to its respective said conveying means and an outlet connected in common to the outlets of other said valve means, and each valve means being responsive to an electric signal, for permitting fluid flow from said inlet to said outlet when said electric signal is present;

valve control means electrically connected to each of said valve means for supplying said electric signal to each of said valve means in a serial sequence, the time period of said signal supplied to a given one of said valve means being related to the proportion in a desired final mixture of the gas in said conveying means connected to said inlet of said given valve means; and mixture selection means electrically connected to said valve control means for permitting selection of the duration of said time period of each said signal supplied to said valve means.

9. An apparatus for mixing gases comprising:

a plurality of means for conveying nonpressure-regulated gases;

valve means for each of said plurality of conveying means, each valve means having an inlet connected to its respective conveying means and an outlet connected in common to the outlets of other said valve means, each valve means being responsive to an electric signal, for permitting fluid flow between said inlet and said outlet when said electric signal is present;

valve control means electrically connected to each valve means for supplying said electric signal to each of said valve means in a serial sequence, the time period of said signal supplied to a given one of said valve means being related to the proportion in a desired final mixture of the gas in said conveying means connected to said inlet of said given valve means;

mixture selection means electrically connected to said valve control means for permitting selection of the duration of said time period of said signal supplied to said valve means;

gas pressure and flow regulating means serially connected in common to said outlets of said valve means for regulating the pressure and rate of flow of gas sequentially flowing from said outlets, said flow regulating means including a pressure regulator and a flowmeter; and mixing chamber means connected to said flow regulating means for receiving gas from said flow regulating means.

10. An apparatus for mixing gases comprising:

a plurality of means for conveying nonpressure-regulated gas;

valve means for each of said plurality of conveying means, each having an inlet connected to said conveying means and an outlet connected to the outlets of other said valve means, and responsive to an electric signal, for permitting fluid flow between said inlet and said outlet when said electric signal is present;

valve control means electrically connected to said valve means for supplying said electric signal to each of said valve means in a serial sequence, the time period of said signal supplied to a given one of said valve means being related to the proportion in a desired final mixture of the gas in said conveying means connected to said inlet of said given valve means;

mixture selection means electrically connected to said valve control means for permitting selection of said time period of said signal supplied to said valve means;

gas pressure and flow regulating means serially connected in common to said outlets of said valve means for regulating the pressure and rate of flow of gas sequentially flowing from said outlets, said flow regulating means including a pressure regulator and a flowmeter;

mixing chamber means connected to said flow regulating means for receiving gas from said flow regulating means and containing said gas as said gas mixes with gas already in said mixing chamber, said mixing means further including leaking means for permitting escape of said gas already in said mixing chamber displaced by said gas; and means connected to said valve control means for causing a predetermined variation of the absolute durations of said time periods selected with said mixture selection means in order to purge said mixing chamber of an unwanted gas composition, said predetermined variation being followed by an automatic reversion of said time periods to said durations selected with said mixture selection means.

11. A method of combining a plurality of separate gases into a desired final mixture comprising the steps of:

(a) sequentially allowing the exclusive flow of each of said plurality of separate nonpressure-regulated gases for a time period related to the desired proportion of each of said plurality of separate gases in said desired final mixture;

(b) regulating the pressure and rate of flow of each of said plurality of separate gases with a common serially connected gas pressure and flow regulation means to be used in turn by each of said plurality of separate gases;

(c) introducing said each of said plurality of separate gases into a mixing chamber where said desired final mixture is to be maintained; and (d) repeating said steps (a), (b), and (c).

12. A method of combining a plurality of separate gases having different respective pressures into a desired final mixture comprising the steps of:

(a) selecting the relative durations that each of said plurality of separate gases is to flow;

(b) generating electric signals of durations related respectively to each of said relative durations that each of said plurality of separate gases is to flow;

(c) sequentially applying said signals to solenoid valves, each of which controls the flow of one of said plurality of separate gases, so as to cause each of said solenoid valves to open in its turn, thus permitting the sequential flow of each of said plurality of gases;

(d) regulating the pressure and rate of flow of said each of said plurality of gases with common pressure and flow regulating means used in turn by said each of said plurality of gases;

(e) introducing each of said plurality of gases into a mixing chamber where said desired final mixture is to be maintained;

(f) exhausting mixed gas already present in said mixing chamber which is displaced by said each of said plurality of gases; and repeating said steps (b), (c), (d), (e), and (f).

13. A method of mixing plural gases in desired proportions by sequentially permitting each gas to flow for selectable time durations, said method comprising the steps of:

automatically sequentially and individually connecting an unregulated pressure source of each gas to a common gas pressure and flow rate control mechanism which feeds a common gas mixing chamber for the respective desired selectable time durations, and cyclically repeating such sequential connections.

14. A method as in claim 13 further including the step of:

selectively interrupting said cyclic repetition of sequential connections to initiate a special purge cycle by automatically sequentially and individually connecting less than all said plural gases for respective extended time durations.

15. A gas mixing apparatus comprising:

N input unregulated gas flow lines;

an electrically controllable on/off flow control device connected in series with each of said N lines;

gas pressure and flow rate determining mechanism connected in common to all N of said on/off control devices to receive gas from said on/off flow control devices and to provide as output respectively corresponding metered gas flows;

a clock source of regular clock pulses;

a digital counter connected to cyclically count said clock pulses;

manually operable digital switches;

a digital signal processing device connected to said counter and to said switches cyclically providing N output control signals at N successive relative elapsed times determined by the setting of said switches, said N control signals being connected to control respective ones of said N on/off flow control devices.

16. A gas mixing apparatus as in claim 15 wherein said counter comprises a ring counter.

17. A gas mixing apparatus as in claim 15 wherein said digital signal processing device comprises N gates for detecting N respective different counter states and for producing N respectively corresponding digital gate output signals, and at least N−1 flip-flops connected to be set and reset by the N digital gate output signals thus defining N control states respectively corresponding to N predetermined combinations of flip-flop states.

18. A gas mixing apparatus as in claim 17 wherein said clock source is capable of selectively producing clock pulses at a first regular rate or a second lower rate and wherein said digital signal processing device further comprises:

a purge control switch, a purge control flip-flop connected to be enabled by operation of said purge control switch and to thereafter control said clock source to operate at said second lower rate during the production of at least N−1 of said N output control signals, said purge control flip-flop also being connected for control by at least two of said digital gate output signals.

19. A precision gas mixing apparatus of the type which mixes plural gases in desired proportions by sequentially permitting each gas to flow for selected time durations, which time durations are related to such desired proportions, said system comprising:

plural input gas flow lines, each having an electrically controllable on/off flow control device connected in series therewith;

a gas flow rate control means fluid connected in common to each of said on/off flow control devices for supplying any one of said plural gases at a desired preset gas flow rate whenever the respectively corresponding on/off flow control device is turned on; and a digital electronic control circuit means connected to provide separate electrical signals for controlling each of said on/off flow control devices;

said digital electronic control circuit means comprising:

a clock providing output pulses at a predetermined rate, a digital counter connected to cyclically count a predetermined number of said output pulses, programmable digital value input means for manually defining desired digital electrical signals, and digital signal comparison and driving circuit means connected to said digital counter and to said digital value input means for providing sequential output signals having relative time durations proportional to the respectively corresponding manually defined digital electrical signals.

20. A precision gas mixing system as in claim 19 wherein:

said first predetermined rate is approximately equal to one thousand pulses per minute, said plural gas flow lines comprise N such flow lines, said programmable digital value input means comprise N−1 three digit defining devices, each such device capable of defining the desired percentage mixture xx.x of its respectively corresponding gas, said digital signal comparison and driving circuit means including means causing the ultimate production of a respective said output signal during the counting of xxx pulses, and said digital signal comparison and driving circuit means including means causing the final Nth output signal to be produced during the counting of any remaining of said approximately one thousand pulses during a nominal one minute cycle interval.

21. A precision gas mixing system as in claim 20 wherein said clock includes means for selectively providing said output pulses at a first predetermined rate or, alternatively, at a lower predetermined rate and further comprising:

a purge control switch connected to manually switch said clock to produce said output pulses at said lower predetermined rate while sequentially producing at least said N−1 output signals.

22. A precision gas mixing system as in claim 20 further comprising an incubator connected as a gas mixing chamber to the output of said gas flow rate determining means.

* * * * *